(12) United States Patent
Kinstler

(10) Patent No.: US 7,337,255 B2
(45) Date of Patent: Feb. 26, 2008

(54) DISTRIBUTED DATA HANDLING AND PROCESSING RESOURCES SYSTEM

(75) Inventor: Gary A. Kinstler, Torrance, CA (US)

(73) Assignee: The Boeing Company, Chicago, IL (US)

( * ) Notice: Subject to any disclaimer, the term of this patent is extended or adjusted under 35 U.S.C. 154(b) by 824 days.

(21) Appl. No.: 10/167,852

(22) Filed: Jun. 12, 2002

(65) Prior Publication Data

US 2003/0233398 A1 Dec. 18, 2003

(51) Int. Cl.
*G06F 13/00* (2006.01)
(52) U.S. Cl. .................................... 710/300
(58) Field of Classification Search ............... 710/300
See application file for complete search history.

(56) References Cited

U.S. PATENT DOCUMENTS

| | | | |
|---|---|---|---|
| 5,894,412 A * | 4/1999 | Faulk | 363/17 |
| 6,166,907 A * | 12/2000 | Chien | 361/699 |
| 6,295,571 B1 * | 9/2001 | Scardamalia et al. | 710/308 |
| 6,359,783 B1 * | 3/2002 | Noble | 361/704 |
| 6,654,353 B1 * | 11/2003 | Tokura et al. | 370/254 |
| 6,736,206 B2 * | 5/2004 | Hisai | 165/260 |
| 6,928,566 B2 * | 8/2005 | Nunomura | 713/322 |
| 6,941,059 B1 * | 9/2005 | Horiguchi | 709/220 |
| 7,127,701 B2 * | 10/2006 | Fables et al. | 717/104 |
| 7,174,381 B2 * | 2/2007 | Gulko et al. | 709/226 |
| 2001/0053149 A1 * | 12/2001 | Mo et al. | 370/389 |
| 2002/0156932 A1 * | 10/2002 | Schneiderman | 709/317 |
| 2003/0074464 A1 * | 4/2003 | Bohrer et al. | 709/232 |
| 2003/0177240 A1 * | 9/2003 | Gulko et al. | 709/226 |

OTHER PUBLICATIONS

Hudgins, C. E.; Schroeder, J. E.; Goldman, P. C., "Avionic Data Switches for the Scalable Coherent Interface", May 22, 1995, Proceedings of the IEEE 1995 National Aerospace and Electronics Conference, vol. 1, pp. 386-391.*
IEEE Standard for Scalable Coherent Interface (SCI), Aug. 2, 1993, IEEE Std. 1596-1992, pp. 26-29.*
"*The Scalable Coherent Interface and Related Standards Projects*" published in IEEE Micro, pp. 10-22, Jan./Feb. 1992, vol. 12, No. 1, Gustavson (as printed from http://www.computer.org/micro/mi1992/m1010abs.html).

(Continued)

*Primary Examiner*—David Wiley
*Assistant Examiner*—J. Bret Dennison
(74) *Attorney, Agent, or Firm*—Armstrong Teasdale LLP

(57) ABSTRACT

The distributed data handling and processing resources system of the present invention includes a) a number of data handling and processing resource nodes that collectively perform a desired data handling and processing function, each data handling and processing resource node for providing a data handling/processing subfunction; and, b) a low latency, shared bandwidth databus for interconnecting the data handling and processing resource nodes. In the least, among the data handling and processing resource nodes, is a processing unit (PU) node for providing a control and data handling/processing subfunction; and, an input/output (I/O) node for providing a data handling/processing subfunction for data collection/distribution to an external environment. The present invention preferably uses the IEEE-1394b databus due to its unique and specialized low latency, shared bandwidth characteristics.

39 Claims, 1 Drawing Sheet

OTHER PUBLICATIONS

"*Scalable Coherent Interface (SCI)*" pp. 1-2 (as printed from http://www.oslo.sintef.no/ecy/projects/SCI_Europe/sci.html).

"*RWTH Scalable Computing Aachen*" published by Lehrstuhl fur Betriebssysteme, pp. 1-4, Univ.—Prof. Dr. habil . Thomas Bemmerl (as printed from http://www.lfbs.rwth-aachen.de/users/joachim/SC).

"*Using SCRAMNet® for Cluster Computing: Early experience*" published by Dept. of Computer & Information Science, The Ohio State University and SYSTRAN Corporation, pp. 1-9, Jacunski et al. and Nagarajan et al. (as printed from http://nowlab.cis.ohio-state.edu/projects/Papers/sc98.html).

"*Scalable Coherent Interface (SCI)*" pp. 1-2 (as printed from http://www.oslo.sintef.no/ecy/projects/SCI_Europe/sci.html), Jan. 13, 2006.

* cited by examiner

DISTRIBUTED DATA HANDLING AND PROCESSING RESOURCES SYSTEM

BACKGROUND OF THE INVENTION

1. Field of the Invention

This invention relates to the partitioning and packaging of the elements of a data handling and processing system and, more particularly, to a data handling and processing system using distributed data handling and processing resource elements and an interconnecting low latency network.

2. Description of the Related Art

Data handling and processing systems are called upon to form the heart of most of today's advanced technological products. Often their components may be grouped together into convenient locations where a minimum mechanical and thermal environmental stress may be presented to the components. In such cases, data handling and processing resources may be functionally and physically partitioned into modules and housed together in multiple-module racks. Modules requiring communication with one another typically rely on a chassis backplane to effect such communications over the relatively short distances of several inches supported by the chassis backplane.

The increasing demands on processing throughput placed on today's systems require these systems to run at ever increasing speeds. These increasing speeds translate into increased power consumption for such modules. The modules' collection together into a common chassis leads to higher power densities for the chassis with modules, and increasing demands on the amount of heat required to be removed from the chassis assembly by its associated thermal designs. Often times, the thermal design includes aggressive active systems to remove such heat, e.g., via the use of forced air convection cooling, conduction cooling through the modules to the chassis and on to the chassis' baseplate, and coldplate mounting surfaces which may, in turn, have be actively cooled by liquid cooling loops. The active cooling required for most modern systems can become a particularly costly environmental support feature for some applications, such as for space applications. Every pound of weight required to create such active cooling accommodations for onboard electronic processing systems can typically cost $10,000 to carry to orbit, at today's launch costs. Methods that could reduce or eliminate such active cooling requirements via, perhaps passive cooling methods, would be especially valuable for space systems. One method which could help alleviate the active cooling requirement, replacing it with a form of passive cooling, would be to divide up processing resources which are normally housed together into multiple-module chassis, packaging them separately and providing an alternative means to communicate with one another than over the usual chassis backplane. With modules individually packaged, the temperature differentials required to remove heat from a module could be reduced by reducing the length of the thermal path to an appropriate heat sink. The communication method used to interconnect modules as a substitute for the backplane of the former chassis would have to offer data transfer bandwidth, addressing flexibility, and time transfer latency comparable to that of a backplane. Further, it would be desirable to create a scalable, larger combined virtual processing capability to accommodate the total processing needs of larger systems.

Some software methods have been developed for partitioning such functions across an arbitrary network and connecting them together with a communications protocol. One such method and standard is known as the Scalable Coherent Interface, and is defined by the open system standard IEEE-1596.

SUMMARY

In a broad aspect, the distributed data handling and processing resources system of the present invention includes a) a number of data handling and processing resource nodes that collectively perform a desired data handling and processing function, each data handling and processing resource node for providing a data handling/processing subfunction; and, b) a low latency, shared bandwidth databus for interconnecting the data handling and processing resource nodes. In the least, among the data handling and processing resource nodes, is a processing unit (PU) node for providing a control and data handling/processing subfunction; and, an input/output (I/O) node for providing a data handling/processing subfunction for data collection/distribution to an external environment. The present invention preferably uses the IEEE-1394b databus due to its unique and specialized low latency, shared bandwidth characteristics.

The present invention allows modules to be packaged separately for easier heat removal, facilitating achievement of a passive cooling objective. Those same modules may be located at more installation convenient or environmentally permissive locations anywhere served by the interconnecting databus. The use of a low latency databus in the present invention is a key enabling technology that allows the elimination of the conventional chassis backplane for intermodule communication.

The present invention is to be differentiated from the practice called "distributed computing." With distributed computing, a typically massive data processing task is partitioned into smaller pieces and then parceled out to a collection of processing nodes, each connected to a central coordinating node. Each processing node is a smaller, but complete, computing system of its own, consisting of modules usually communicating with one another across the backplane of their common chassis. An interconnecting databus network is used to communicate the task pieces, including input data and output results between individual nodes and the central coordinating node.

The present invention is also to be distinguished from other distributed processing and data handling resource concept implementations that utilize reflective memory to effect low latency communication between processing element nodes. Reflective memory mechanizations maintain a replicated shared memory space in each on the nodes that require internode communication to one another. Any change written into the shared reflective memory portion in one node is passed on to all other nodes and therein updated. Such shared memory blocks are a relatively small (e.g., 4 MByte) portion of the usually addressable address space within each node. When larger address spaces must be transferred between nodes, as is commonly the case, the reflective memory serves in the capacity of an input/output buffer with the buffer data being rewritten to other memory locations within each node. One such reflective memory system is marketed under the brand name SCRAMNet® (see "Using SCRAMNet® for Cluster Computing: Early experiences," by Matt Jancunski, et. al., available on the Internet at http://nowlab.cis. ohio-state.edu/proiects/Papers/sc 98,htm). The present invention does not rely on memory replication for data transfer, but instead may directly address the memory space within other nodes and transport that data directly between large address spaces within each node. Such capability is provided by an appropriate addressing format within the protocol of the databus. Additionally, the databus accomplishes such transfers with a time latency comparable to that achievable over conventional chassis backplanes. The present invention is also to be distinguished from a similar technology and standard which is known as the Scalable Coherent Interface, or SCI (see (1) "Scalable Coherent Interface (SCI)," available on the Internet at http.//www.oslo.sintef.no/ecy/proiects/SCI Europe/sci.html and (2) "SCI-Connected Clusters at the LfBS", available on the Internet at http://www.lfbs.rwth-aachen.de/users/joachim/SCI). As defined in the first page of the "Scalable Coherent Interface" reference, "SCI is an IEEE-standard which defines a protocol for remote memory-access of distributed compute systems. This kind of interconnect can be sorted under the current term System Area Net (SAN)". Its methods are defined by the IEEE-1596 standard. It presents a software and hardware based methodology for memory access between nodes, allowing them to operate cooperatively with one another as though they were a larger virtual processing machine. In this aspect, the present invention provides the same capability, except that the computer nodes themselves need not be complete computers themselves. The present invention does not depend upon the use of the IEEE-1596 SCI protocol elements but may, for the efficiency afforded by the use of such prior art, employ a subset of them in the buildup of the software drivers of the present invention. Further, as stated on page 2 of the reference "SCI-Connected Clusters at the LfBS", "The communication protocol is implemented in hardware and thus operates very efficiently", indicating that the SCI is implemented with specific hardware support to achieve its wide addressability, low latency data passing. The present invention, as will be disclosed in more detail below, does not require such dedicated embedded hardware beyond that normally required for the interface to the databus itself.

DETAILED DESCRIPTION OF THE INVENTION

Figure 1:
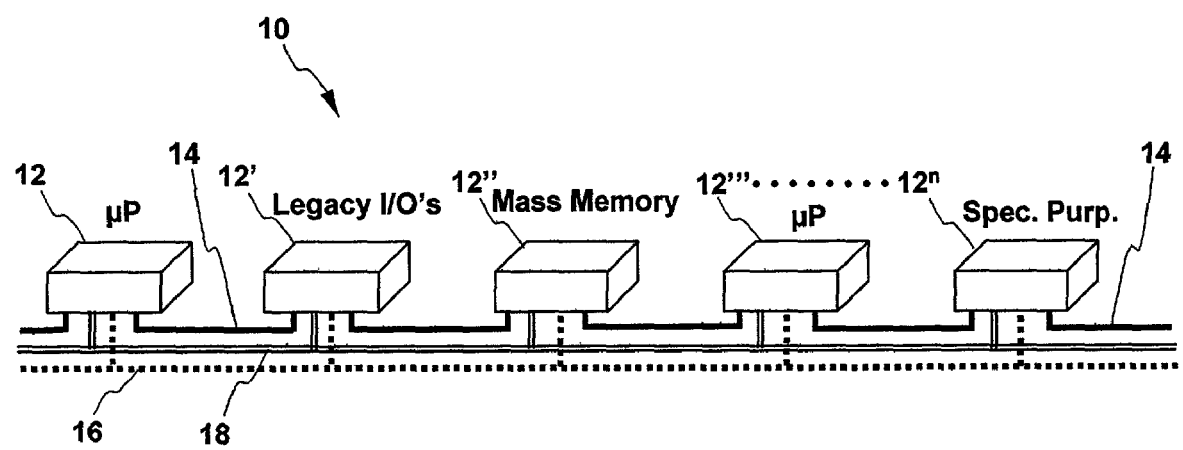
FIG. 1 is a schematic illustration of a preferred embodiment of the distributed data handling and processing resources system of the present invention.

Referring to the drawings and the characters of reference marked thereon, FIG. 1 illustrates a preferred embodiment of the distributed data handling and processing resources system of the present invention, designated generally as 10. The system 10 includes a plurality of data handling and processing resource nodes 12, 12', 12", . . . 12''' that collectively perform a desired data handling and processing function. A low latency, shared bandwidth databus 14 interconnects the data handling and processing resource nodes 12.

Each data handling and processing resource node 12 provides a desired data handling/processing subfunction. As used herein a "data handling/processing subfunction" means the performing coordination and controlling the flow of data through the system including, if necessary, conducting processing upon such data for the purpose of generating new desired outputs. In the minimum, the system 10 must include a processing unit (PU) node 12 for providing a control and data handling and processing subfunction; and, an input/output (I/O) node 12' for providing a data handling/processing subfunction for data collection/distribution to an external environment.

A control and data handling/processing subfunction may include, for example, the processing normally provided in a conventional computer by a CPU. The PU node 12 may comprise a variable power microprocessor such as those currently used in some space applications; a low power microprocessor such as IBM's new silicon-on-insulator processor, Intel's Tualatin™, or Advanced Micro Devices' Athlon™ 4; or, a microprocessor that uses voltage and clock frequency scaling to achieve variable power characteristics, such as the Transmeta Corporation's Crusoe™ processor.

A data handling/processing subfunction for an input/output of node 12' for data collection/distribution may include, for example, remote interface units.

The low latency, shared bandwidth databus 14 preferably comprises an IEEE-1394b databus. The selection of IEEE-1394b with its efficient and prioritizable BOSS (Bus Owner/Supervisor/Selector) bus access protocol uniquely (relative to other bus protocol choices) provides the capability of providing data transfer latencies comparable to that of a backplane. Its improved efficiency is also notable and extremely important to achieving low latency by virtually eliminating the arbitration subaction gaps (timeout periods) previously used for negotiating access to the bus in earlier (1394a) versions of the bus. Such performance further allows utilizing software elements of a scalable coherent interface standard, as necessary or desirable without other dedicated hardware chip support as conventionally required with an SCI interface. The scalable coherent interface standard may comprise the Scalable Coherent Interface Standard IEEE-1596. The low latency, shared bandwidth databus may be implemented, for example, as a dual-redundant databus, comprising two IEEE-1394b databuses. It could also be implemented as a dual-redundant databus, comprising a single IEEE-1394b databus configured as a dynamically reconfigurable loop to achieve fail-and-still-operate capability. The low latency, shared bandwidth databus may provide low message packet sizes to achieve low latency.

As used herein, the term "low" in referring to the latency means a latency of less than 100 microseconds. The databus preferably has a latency of between about 0.5 to 10 microseconds.

One of the data handling and processing resource nodes 12 preferably includes a memory node 12" for providing a memory subfunction. The memory node 12" may be volatile or non-volatile depending on the desired application. This might include expanded memory for running large application programs which do not have sufficient room to run in the memory contained totally within the processing element modules, 12 or 12'''. Such memory modules 12" might also contain non-volatile memory storage for collecting and retaining on-board vehicle health or performance data.

Other data handling and processing resource nodes 12 may comprise special purpose data handling and processing resource nodes such as modules for providing subsystem control functions for vehicle engine valves or servos for guidance control surfaces.

The system 10 of the present invention may include a passive cooling interface assembly 16 for connection to a passive cooling system (not shown). The passive cooling interface assembly 16 may include, for example, linear or loop heat pipes, with various internal phase change liquid mechanims therein, or may simply be totally static thermal conduction paths fabricated from metallic cables or special thermal materials. The heat may be removed to a hardmount or, via copper or a heat pipe cable, removed to a more distant heat sink location. The passive cooling interface assembly 16 is operatively associated with the data handling and processing resource nodes 12. It is interfaced to the nodes' enclosure for transferring heat away from the enclosure.

In this preferred embodiment, using the IEEE-1394b databus, the data handling and processing resource nodes 12 receive their operating power from power cables 18 that are commingled with the databus 14.

The data handling and processing resource nodes 12 may employ high power conversion efficiencies from respective power sources associated therewith. Such power sources may be, for example, power carried within the signal cable harness assembly, or supplied separately to the unit via separate power cable harness lines. The high power conversion efficiencies may be in a range of from about 85 to 95 percent.

Preferably, an application program interface (API) is interposed between the low latency, shared bandwidth databus 14 and a user for segmenting large messages into smaller pieces. Such an API provides the function of creating gaps within larger messages so that other messages that require low latency bus access can gain timely access to the bus without having to wait for total completion of large messages. The databus 14 may include a large, directly addressable, non-overlapping address space serving all of the data handling and processing resource nodes 12. The address space may be greater than 1 terabyte.

During the typical operation of the system of the present invention, data is usually gathered by sensors external to the system and provided to the system through legacy signal input/output modules 12'. Such data is typically relayed to a processing element module 12 or 12''', where collected data is processed by software algorithms residing in the processing elements, creating a new desired output. Such output is then typically sent to its destination external to the system, again via another input/output module 12', for obtaining its desired effect on the vehicle. During the course of such processing, the processing element may depend on the use of the extended or mass memory module 12" to assist the program execution, or to store some of the results in non-volatile memory for later use. In some cases, an end effector (e.g., an engine valve or actuator servo) may require local support for control loop closure or signal conditioning, which may be accomplished with the use of a special purpose module 12'''.

The present invention, in addition to facilitating the objectives of passive cooling and more convenient installation locations, also has the advantage of reducing the total weight of the system required to perform a given total data handling and processing function. This arises from the ability to discard the conventional backplane and chassis required in conventional modular avionics approaches.

The present invention is particularly adaptable for use with an avionics core processing system. One principal application for the present invention is for space vehicle applications, where considerable weight savings over the conventional chassis approach may be expected. Also, the use of low power techniques discussed herein will allow significant reductions in power for the total system. Lastly, the potential for achieving passively cooled avionics can result in a significant weight savings associated with conventional cooling techniques used with conventional modular avionics systems. It may also be used for an avionics peripheral processing system, or as a data handling system without conventional processing functions for the coordination of data flows in communications streams.

Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

The invention claimed is:

1. A distributed data handling and processing resources system, comprising:
 a) a plurality of remotely located and directly interconnected data handling and processing resource nodes, each of said nodes directly connected to at least one other of said nodes, said nodes collectively perform a desired data handling and processing function, each of said nodes providing only one data handling/processing subfunction, said plurality of nodes, comprising, at least:
  i) a processing unit (PU) node for providing a control and data handling/processing subfunction; and,
  ii) an input/output (I/O) node for providing a data handling/processing subfunction for data collection/distribution to an external environment;
 b) a low latency, shared bandwidth databus for interconnecting said data handling and processing resource nodes; and
 c) a passive cooling interface assembly interconnecting said plurality of remotely located data handling and processing resource nodes.

2. The distributed data handling and processing resources system of claim 1 wherein said low latency, shared bandwidth databus comprises an IEEE-1394b databus.

3. The distributed data handling and processing resources system of claim 1 wherein said low latency, shared bandwidth databus has a latency of less than 100 microseconds.

4. The distributed data handling and processing resources system of claim 1 wherein said low latency, shared bandwidth databus has a latency of between 0.5 and 10 microseconds.

5. The distributed data handling and processing resources system of claim 1 wherein said plurality of data handling and processing resource nodes comprises a memory node for providing a memory subfunction.

6. The distributed data handling and processing resources system of claim 5 wherein said memory node comprises a non-volatile memory node.

7. The distributed data handling and processing resources system of claim 5 wherein said memory node comprises a volatile memory node.

8. The distributed data handling and processing resources system of claim 1 wherein said low latency, shared bandwidth databus interconnects said data handling and processing resource nodes utilizing a scalable coherent interface standard.

9. The distributed data handling and processing resources system of claim 8 wherein said scalable coherent interface standard comprises the Scalable Coherent Interface Standard IEEE-1596.

10. The distributed data handling and processing resources system of claim 1 wherein said passive cooling interface assembly is configured for connection to a passive cooling system.

11. The distributed data handling and processing resources system of claim 1 wherein said plurality of data handling and processing resource nodes receive their operating power from power cables that are commingled with said low latency, shared bandwidth databus.

12. The distributed data handling and processing resources system of claim 1 wherein said PU node comprises a variable power microprocessor.

13. The distributed data handling and processing resources system of claim 1 wherein said PU node comprises a low power microprocessor.

14. The distributed data handling and processing resources system of claim 1 wherein said PU node comprises a microprocessor that uses voltage and clock frequency scaling to achieve variable power characteristics.

15. The distributed data handling and processing resources system of claim 1 wherein said plurality of data handling and processing resource nodes employ high power conversion efficiencies from respective power sources associated therewith.

16. The distributed data handling and processing resources system of claim 15 wherein said high power conversion efficiencies are in a range of from 85 percent to 95 percent.

17. The distributed data handling and processing resources system of claim 1 wherein said low latency, shared bandwidth databus provides low message packet sizes to achieve low latency.

18. The distributed data handling and processing resources system of claim 1 wherein said low latency, shared bandwidth databus provides low message packet sizes in a range of 0.5 to 5.0 microseconds to achieve low latency.

19. The distributed data handling and processing resources system of claim 1 further comprising an application program interface (API) interposed between said low latency, shared bandwidth databus and a user for segmenting large messages into smaller pieces.

20. The distributed data handling and processing resources system of claim 1 wherein said low latency, shared bandwidth databus includes a large, directly addressable, non-overlapping address space serving said plurality of data handling and processing resource nodes.

21. The distributed data handling and processing resources system of claim 1 wherein said low latency, shared bandwidth databus includes a large, directly addressable, non-overlapping address space serving said plurality of data handling and processing resource nodes, said address space being greater than 1 terabyte.

22. The distributed data handling and processing resources system of claim 1 wherein said low latency, shared bandwidth databus includes a protocol with priority features for providing low latency access for messages requiring low latency in the presence of other, lower priority messages waiting to be transmitted.

23. The distributed data handling and processing resources system of claim 1 wherein said plurality of data handling and processing resource nodes comprises an avionics core processing system.

24. The distributed data handling and processing resources system of claim 1 wherein said plurality of data handling and processing resource nodes comprises an avionics peripheral processing system.

25. The distributed data handling and processing resources system of claim 1 wherein said low latency, shared bandwidth databus is implemented as a dual-redundant databus, comprising two IEEE-1394b databuses.

26. The distributed data handling and processing resources system of claim 1 wherein said low latency, shared bandwidth databus is implemented as a dual-redundant databus, comprising a single IEEE-1394b databus configured as a dynamically reconfigurable loop to achieve fail-and-still-operate capability.

27. A distributed data handling and processing resources system, comprising:
  a) a plurality of remotely located and directly interconnected data handling and processing resource nodes, each of said nodes directly connected to at least one other of said nodes, said nodes collectively perform a desired data handling and processing function, each of said nodes providing only one data handling/processing subfunction, said plurality of nodes, comprising, at least:
    i) a processing unit (PU) node for providing a control and data handling/processing subfunction;
    ii) an input/output (I/O) node for providing a data handling/processing subfunction for data collection/distribution to an external environment; and,
    iii) a memory node for providing a memory subfunction; and,
  b) a low latency, shared bandwidth databus for interconnecting said data handling and processing resource nodes, said low latency, shared bandwidth databus comprising an IEEE-1394b databus.

28. The distributed data handling and processing resources system of claim 27 wherein said low latency, shared bandwidth databus has a latency of less than 100 microseconds.

29. The distributed data handling and processing resources system of claim 27 wherein said low latency, shared bandwidth databus has a latency of between 0.5 and 10 microseconds.

30. The distributed data handling and processing resources system of claim 27 wherein said memory node comprises a non-volatile memory node.

31. The distributed data handling and processing resources system of claim 27 wherein said memory node comprises a volatile memory node.

32. The distributed data handling and processing resources system of claim 27 wherein said low latency, shared bandwidth databus interconnects said data handling and processing resource nodes utilizing a scalable coherent interface standard.

33. The distributed data handling and processing resources system of claim 32 wherein said scalable coherent interface standard comprises the Scalable Coherent Interface Standard IEEE-1596.

34. The distributed data handling and processing resources system of claim 27 further comprising a passive cooling interface assembly for connection to a passive cooling system.

35. A passively-cooled distributed data handling and processing resources system for an avionics processing system, comprising:
  a) a plurality of remotely located and directly interconnected data handling and processing resource nodes, each of said nodes directly connected to at least one other of said nodes, said nodes collectively perform a desired data handling and processing function for an avionics, each of said nodes providing only one data handling/processing subfunction, said plurality of nodes, comprising, at least:
    i) a processing unit (PU) node for providing a control and data handling/processing subfunction;
    ii) an input/output (I/O) node for providing a data handling/processing subfunction for data collection/distribution to an external environment; and,
  b) a low latency, shared bandwidth databus for interconnecting said data handling and processing resource nodes; and, c) a passive cooling interface assembly in heat transfer relationship with said plurality of remotely located data handling and processing resource nodes for transferring heat from said plurality of remotely located data handling and processing resource nodes.

36. The passively-cooled distributed data handling and processing resources system of claim 35 wherein said low latency, shared bandwidth databus comprises an IEEE-1394b databus.

37. The passively-cooled distributed data handling and processing resources system of claim 35 wherein said plurality of data handling and processing resource nodes comprises a memory node for providing a memory subfunction.

38. The distributed data handling and processing resources system of claim 1 wherein said passive cooling interface assembly comprises at least one of heat pipes having phase change liquid mechanisms therein and thermal conduction paths fabricated from one or more of metallic cables and thermal materials.

39. The distributed data handling and processing resources system of claim 1 wherein said plurality of data handling and processing resource nodes each comprise an enclosure, said passive cooling interface assembly interfaced to said enclosures.

* * * * *